(12) United States Patent
Sermon

(10) Patent No.: US 11,592,165 B1
(45) Date of Patent: Feb. 28, 2023

(54) MODULAR LIGHT HOUSING

(71) Applicant: B.C. Lighting LLC, Idaho Falls, ID (US)

(72) Inventor: Austin B. Sermon, Idaho Falls, ID (US)

(73) Assignee: B.C. Lighting LLC, Idaho Falls, ID (US)

( * ) Notice: Subject to any disclaimer, the term of this patent is extended or adjusted under 35 U.S.C. 154(b) by 0 days.

(21) Appl. No.: 17/890,220

(22) Filed: Aug. 17, 2022

(51) Int. Cl.
  *F21V 23/00* (2015.01)
  *F21V 17/06* (2006.01)
  *F21W 131/10* (2006.01)

(52) U.S. Cl.
  CPC ............ *F21V 23/002* (2013.01); *F21V 17/06* (2013.01); *F21W 2131/10* (2013.01)

(58) Field of Classification Search
  CPC ...... F21V 19/04; F21V 19/047; F21V 23/002; F21V 33/006; F21V 15/01; F21V 23/001; F21W 2131/10
  See application file for complete search history.

(56) References Cited

U.S. PATENT DOCUMENTS

| | | | |
|---|---|---|---|
| 8,104,929 B2 * | 1/2012 | Kovalchick | F21V 29/74 362/373 |
| 8,382,347 B2 * | 2/2013 | McCanless | F21V 15/01 362/249.02 |
| 8,602,585 B1 * | 12/2013 | Lowe | F21V 21/0824 362/153.1 |
| 8,708,522 B2 | 4/2014 | Wang | |
| 10,274,188 B2 * | 4/2019 | Sculler | F21V 11/08 |
| 10,465,864 B2 | 11/2019 | Leichner | |
| 11,333,329 B2 | 5/2022 | Steele | |
| 2009/0147521 A1 * | 6/2009 | Zhang | F21V 29/763 362/294 |
| 2010/0079998 A1 * | 4/2010 | Mrakovich | F21V 29/60 362/249.02 |
| 2022/0290823 A1 * | 9/2022 | Martinez | F21L 4/045 |

* cited by examiner

*Primary Examiner* — Matthew J. Peerce
(74) *Attorney, Agent, or Firm* — Trojan Law Offices

(57) ABSTRACT

A modular light housing apparatus for removably holding a light assembly includes a light transmissible portion and a cover portion. The cover portion is releasably coupled to the light transmissible portion and the light transmissible portion has a mounting region and a light compartment configured for transmitting light from the apparatus. Wire passages are provided between the mounting region and the light compartment, which is defined by a frame. The frame has a plurality of wire conduits, each near one of the wire passages. The wire conduits each have a conduit opening opposite one of the wire passages. The cover portion has a light mount for holding the light source, and the wires travel through the wire passages, wire conduits, and conduit openings to engage a light source.

11 Claims, 5 Drawing Sheets

MODULAR LIGHT HOUSING

FIELD OF THE INVENTION

The present invention relates generally to light fixtures. More specifically the invention relates to modular light housing modules that can be dissembled and reassembled to accommodate a variety of different light source assemblies, thereby allowing users to reconfigure a light fixture as desired to achieve various lighting effects easily and at low cost.

BACKGROUND OF THE INVENTION

In the fields of commercial and residential lighting, light fixtures serve a wide variety of functions. Practical functions include, for example, streetlights that allow cars to be driven safely at night. Aesthetic functions include mood lighting that provide spaces a desired ambiance. There are myriad light source options, all with their respective uses and effects.

However, for users to enjoy the full range of possible light sources, they currently must spend time and money removing existing light fixtures and replacing them with new fixtures whenever they want a design change. This is because conventional light fixtures typically come with a light source assembly integrated into a light housing, such that one cannot be separated from the other. Thus, users wanting to change a light source from one type to another, or from one size to another, have no choice but to replace an entire light fixture. For example, switching from a fluorescent lamp to an LED bulb may require replacing a pin socket with a screw socket, including different wiring or circuitry to handle new electrical requirements (e.g., voltage, amperage, circuit load, etc.). In such situations, changing a light source often requires changing an entire light source assembly. Because conventional light fixtures do not allow users to change out only a light source assembly, the entire light fixture is replaced instead.

Another issue with light fixtures known in the art that cannot be dissembled or reassembled is that if part of the light source assembly or housing is damaged, the user must again remove and replace the entire light fixture even if one of the two is still operational and does not need replacement. This can be a wasteful and often expensive process.

Finally, regarding the placement of light fixtures, current solar-powered light fixtures with solar panels built into the housing must be placed in areas that receive ample sunlight during the day, otherwise they will not store enough energy to produce light at night. This severely limits light placement options since it rules out all areas that are shaded during the day, even if they would be perfect for illuminating at night.

Therefore, there is currently a need in the market for a modular light fixture that can be reconfigured to accommodate light source assemblies of varying types and sizes without changing any of the light fixture's other components or configurations. There is also a need to provide a light source that can be replaced separately from its housing if one or the other is damaged. There is also a need for providing placement flexibility to solar-powered light fixtures.

SUMMARY OF THE INVENTION

A modular light housing and light fixture apparatus is disclosed for removably holding a light source, typically a powered light source having wires. The apparatus includes a light transmissible portion and a cover portion. The cover portion is releasably coupled to the light transmissible portion in order to access the light source inside the apparatus. Preferably the light transmissible portion includes a mounting region configured for mounting the light transmissible portion, and a light compartment configured for transmitting light from the apparatus.

A wire passage is provided between the mounting region and the light compartment. The light compartment includes a wire conduit proximate to the wire passage, such that wires extending through the wire passage enter the wire conduit. The wire conduit includes a conduit opening opposite the wire passage, whereby the wires exit the wire conduit near the cover portion. The cover portion includes a light mount for holding the light source, such that the wires travel through the wire passage, wire conduit, and out the conduit opening to engage the light source situated in the light mount.

The cover portion preferably includes a wire channel extending from the conduit opening to the light mount. The cover portion may also have one or more reflector panels. One of the reflector panels preferably includes a tab configured to cover the wire channel. To soften the light emitted by a light source in the light mount, a light mount cover, which may be translucent, may be provided for covering the light source in the light mount. In addition to one or more reflector panels, the light transmissible portion preferably includes a bottom reflector opposite the light mount. Additionally, the mounting region may include a mounting flange, whereby the light fixture is configured for seating on a fence post or similar mounting location.

The light transmissible portion may include a frame, which defines the light compartment. In one preferred embodiment, the frame may include or form the wire conduit, thus hiding the wires from view. The frame may also define a light transmission window. The light transmissible portion may also include a support flange and a bottom reflector, which together define the wire passage. In one preferred embodiment, the support flange may include a pane clip for holding a clear or translucent pane in the frame, thus enabling the light fixture to emit light.

In another implementation, a light fixture apparatus is disclosed for removably holding a light source powered by wires. The apparatus includes a light transmissible portion and a cover portion. The cover portion is preferably releasably coupled to the light transmissible portion. The light transmissible portion includes a mounting region configured for mounting the light transmissible portion, and a light compartment configured for transmitting light from the apparatus. A plurality of wire passages is positioned between the mounting region and the light compartment, and a frame defines the light compartment. Preferably the frame includes a plurality of wire conduits, with each conduit proximate to one of the plurality of wire passages. The plurality of wire conduits also each have a conduit opening opposite one of the plurality of wire passages.

The cover portion includes a light mount for holding the light source, and the wires travel through at least one of the plurality of wire passages, at least one of the wire conduits, and out at least one of the conduit openings to engage the light source in the light mount. The cover portion may include a plurality of wire channels, with each wire channel extending from one of the plurality of conduit openings to the light mount.

DESCRIPTION

Figure 1:
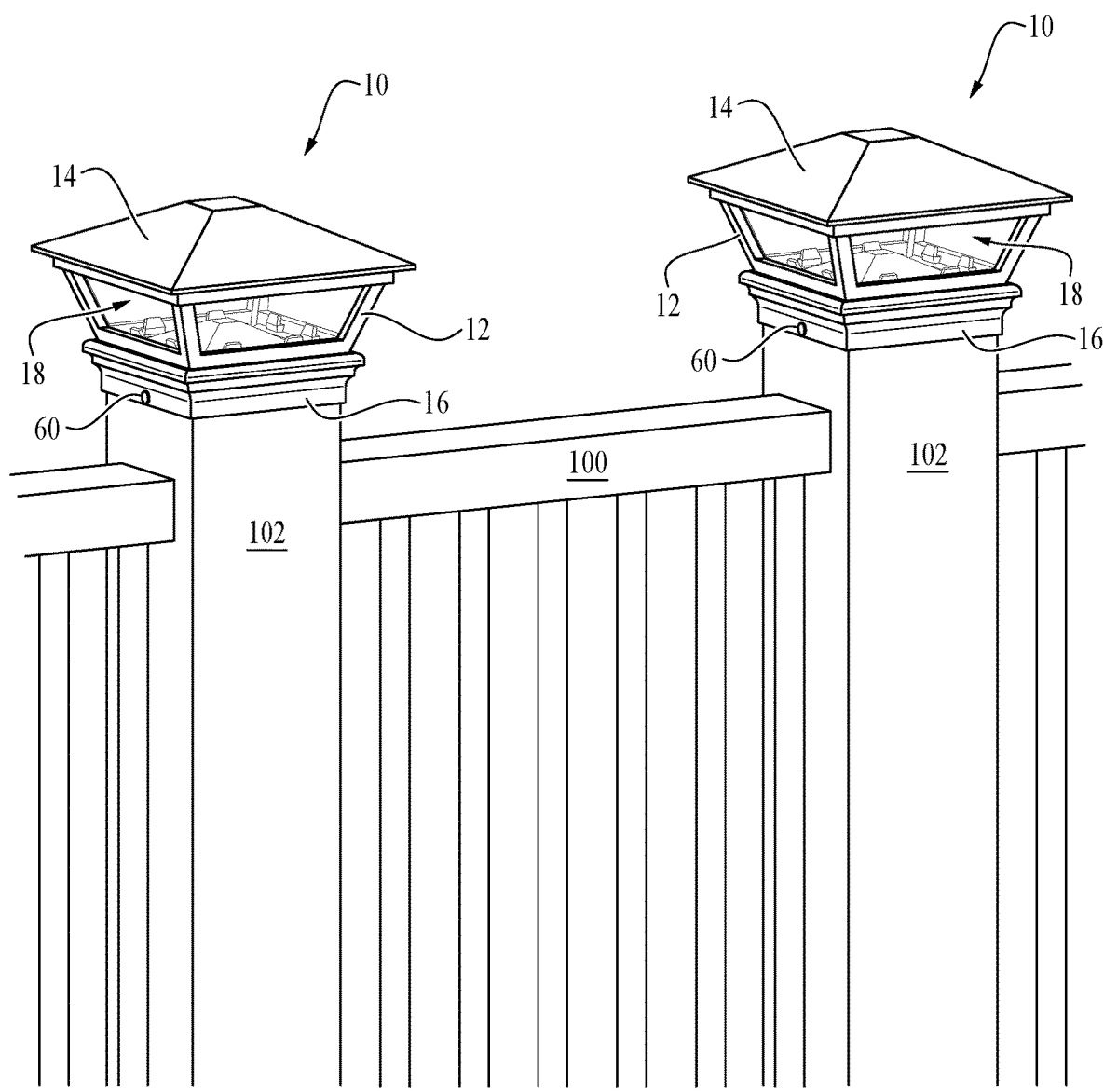
FIG. 1 is a perspective view of a series of modular light housings installed on a fence post.

Referring to FIG. 1, a plurality of modular light housings 10 are shown installed in series on a fence 100 having fence posts 102. The modular light housings 10 may be installed atop each of the fence posts 102 in any conventional manner, although mounting flange fasteners 60 are used in the illustrated embodiment. It is anticipated that the modular light housings 10 each hold a wired light source (not shown), which may be connected electrically in series by wiring each modular light housing 10 through a fence post 102. In this manner, an entire run of fencing can be installed with modular light housings 10.

Figure 2:
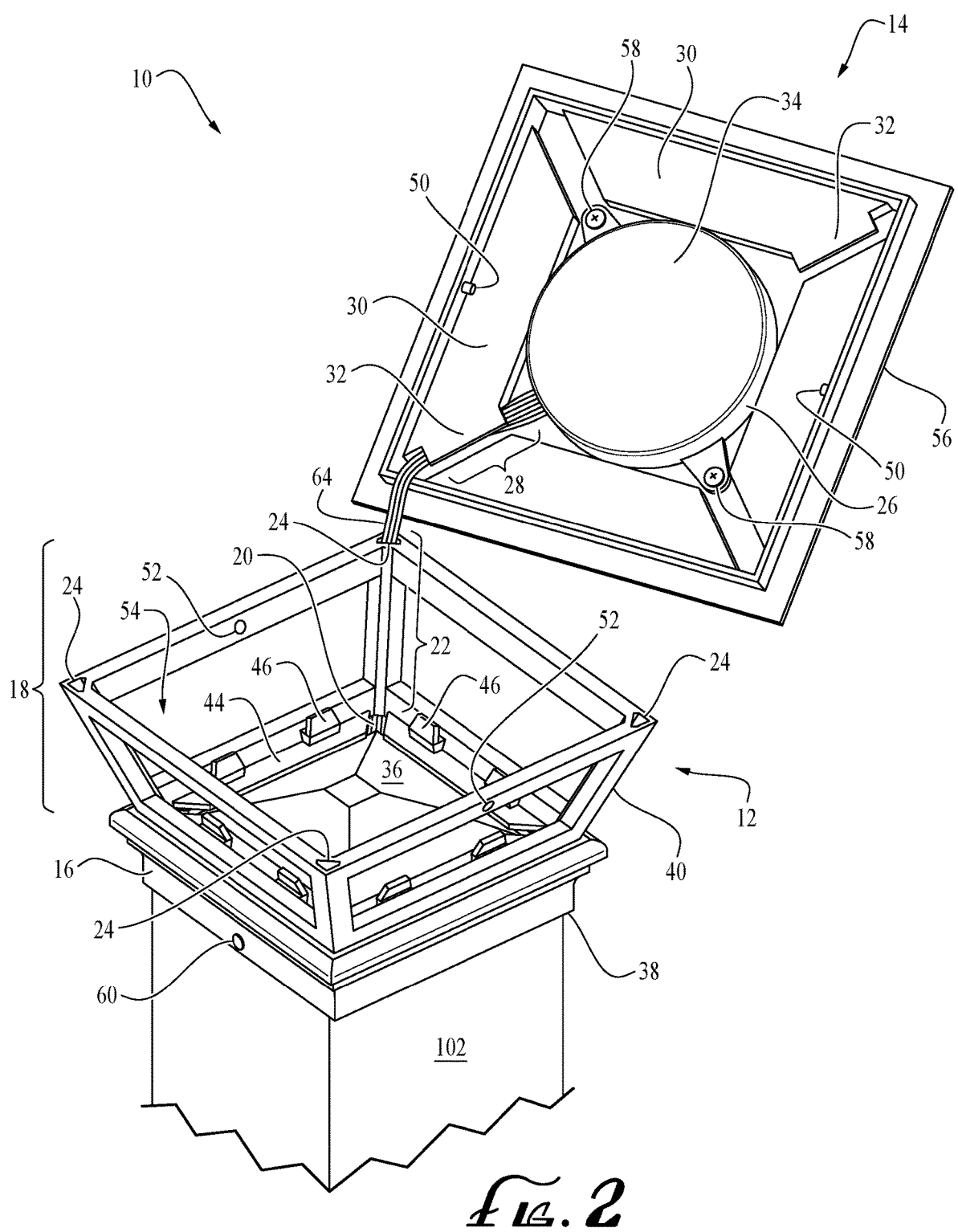
FIG. 2 is a top perspective view of the modular light housing with cover portion removed from a light transmissible portion.

Referring to FIG. 2, a single light housing module 10 has two primary components, a light transmissible portion 12 and a cover portion 14. The light transmissible portion 12 has a mounting region 16 for engaging fence post 102 and a light compartment 18 for emitting light. The mounting region 16 and the light compartment 18 are separated, except for a wire passage 20 provided for allowing wires 64 to travel between them.

Still referring to FIG. 2, the light compartment 18 preferably includes a frame 40 to support the cover portion 14, and also to provide a series of windows 54 through which light is emitted from the light housing 10. The frame 40 also forms a wire conduit 22 through which the wires 64 may travel from the wire passage 20 to the cover portion 14. In the illustrated embodiment, a frame 40 that is square in plan view is shown, with wire passages 20 and wire conduits 22 at each corner of the frame 40. In other preferred embodiments, other shapes of frames are contemplated, including those having curvatures or spherical shapes.

Still referring to FIG. 2, a series of support flanges 44 are provided on the frame 40 in order to help hold the bottom reflector 36 in place, along with supporting a series of pane clips 46. The pane clips 46 are provided to hold panes of transparent or translucent material (not shown) according to preference. As illustrated, the support flanges 44 are also preferably configured to provide the wire passages 22, allowing the wires 64 to move from the mounting region 16 to the light compartment 18.

Still referring to FIG. 2, each wire conduit 22 ends in a conduit opening 24 at the top of the frame 40. Thus, the wires 64 are entirely hidden from view as they travel through the frame 40 portion of the light compartment 18. In the illustrated embodiment, the conduit openings 24 are each provided at a corner of the frame 40, corresponding to a corner of the cover portion 14 which, in the illustrated embodiment, is also square in plan view. In other embodiments, other conduit configurations, for example, where a conduit is provided centrally, etc. are contemplated.

Still referring to FIG. 2, the cover portion 14 includes one or more wire channels 28 extending from a position near the conduit openings 24 to a centrally located light mount 26. In the illustrated embodiment, where the cover portion 14 is square, as discussed above, the wire channels 28 each have a terminus at a corner of the cover portion 14 which is adjacent the corners of the light compartment 18 when the cover portion 14 is placed on the light transmissible portion 12.

Additionally, one or more reflector panels 30 may be provided for increasing the light output of the light hosing 10. In the illustrated embodiment, the reflector panels 30 include a tab 32 for covering the wires 64, thereby enclosing them in the wire channel 28. For removing the cover portion 14 from the light transmissible portion 12, a peg 50 and peg hole 52 arrangement is provided, such that simply pulling up on a cover flange 56 of the cover portion 14 disengages the cover portion 14. Likewise, pushing the cover portion 14 back down on the frame 40 of the light transmissible portion 12 releasably re-engages the cover portion 14 thereon. Although the peg 50 and peg hole 52 arrangement is shown in the illustrated embodiment, any other means of releasably securing the cover portion 14 onto the light transmissible portion 12 is contemplated. The light mount 26 may be mounted to the cover portion 14 using light mount fasteners 58 or another similar method of fixation. Additionally, a light mount cover 34 may be provided for diffusing light in the light compartment as well as protecting the light assembly (not shown) installed in the light mount 26.

Figure 3:
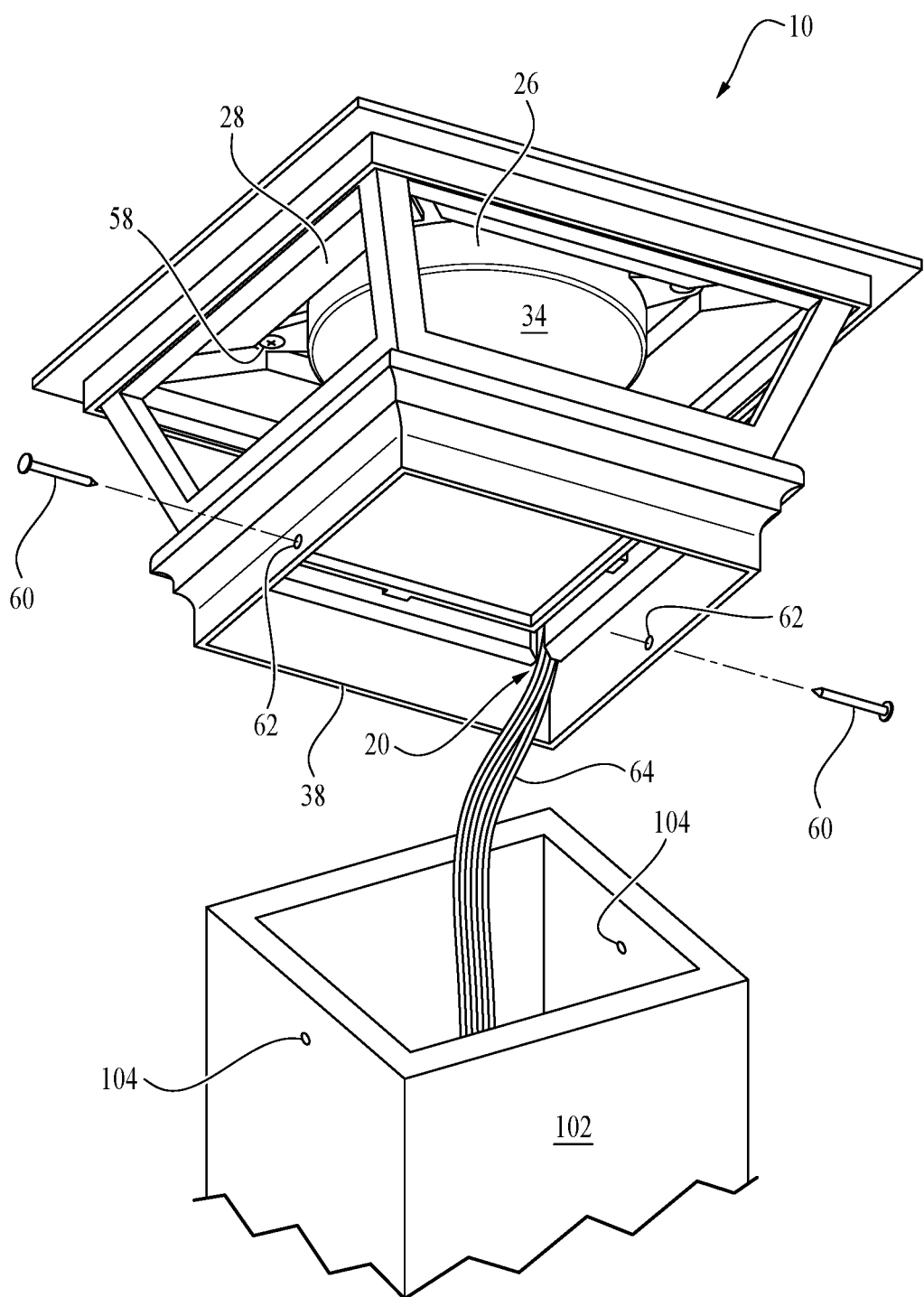
FIG. 3 is a bottom perspective view of a modular light housing after removal from the fence post.

Referring to FIG. 3, the bottom of the light housing 10 is shown as it connects to a fence post 102. The fence post 102 has already been provided with wires 64 for powering a light assembly (not shown). The mounting flange 38 is configured with a shape complimentary to the fence post 102, square in the illustrated embodiment, such that the mounting flange 38 seats over the fence post 102. The fence post 102 includes a post mounting hole 104, and the mounting flange 38 includes a mounting flange hole 62 that align together. Thus, a mounting flange fastener 60 can be driven through the mounting flange 38 and into the fence post 102, thereby holding the light housing 10 stable on the fence 100 (FIG. 1).

Figure 4:
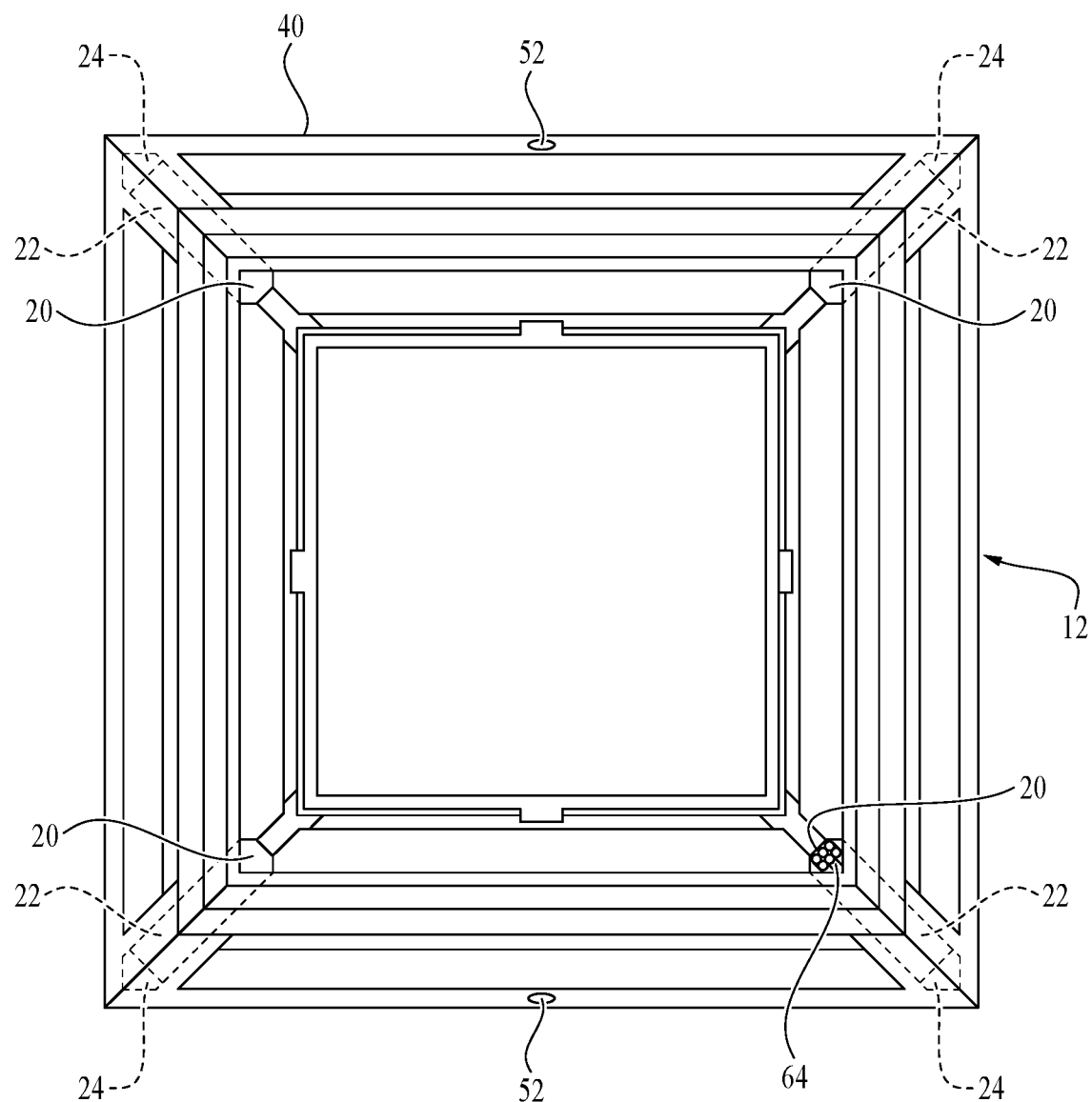
FIG. 4 is a bottom plan view of the modular light housing.

Referring to FIG. 4, the light transmissible portion 12 is shown from below, illustrating the wire passages 20, the wire conduits 22, and the conduit openings 24. By providing several of each of these features, the wires 64 can travel in any position from the fence post 102 to the cover portion 14, as shown in FIG. 3. Additionally, in instances where a light assembly (not shown) is placed along a wire of many light assemblies (i.e., wired in series), having multiple wire conduits 22, and related structures, allows a light assembly to be wired into the light mount 34 (FIG. 3) and the wires to continue on to the next light housing 10 as shown in FIG. 1.

Figure 5:
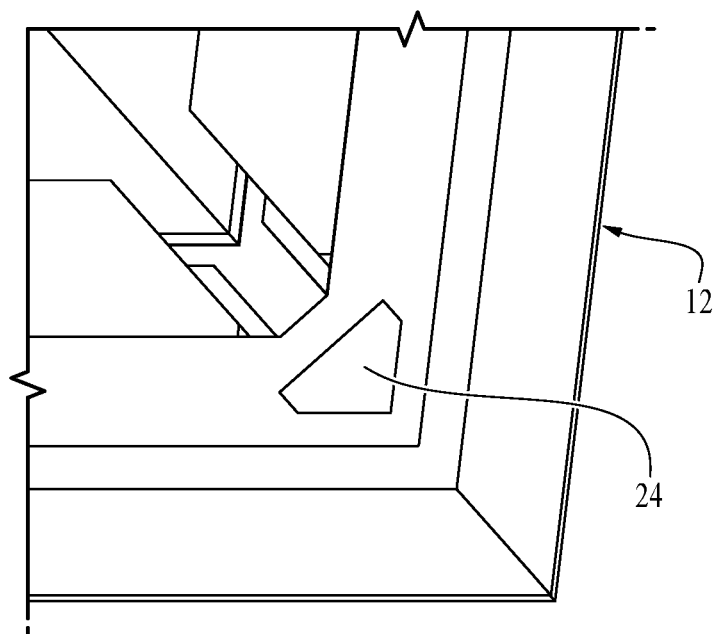
FIG. 5 is a top plan view of one corner of the light transmissible portion.
Figure 6:
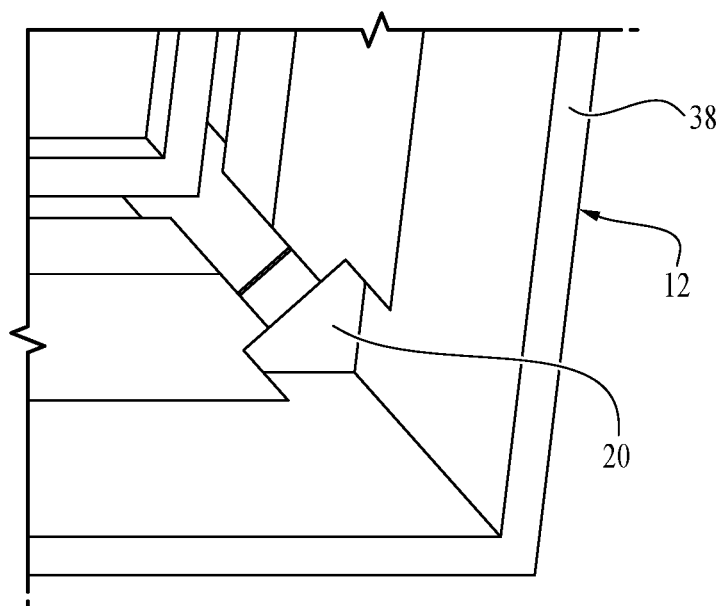
FIG. 6 is a bottom plan view of one corner of the light transmissible portion.

Referring to FIGS. 5 and 6, a close-up view of one corner of the light transmissible portion 12 from above (FIG. 5) and below (FIG. 6) are shown. In the square embodiment, wires 64 (FIGS. 2, 3, and 4) travel from the fence post 102 (FIGS. 1, 2, and 3) up through the wire passage 20, through the wire conduit 22, and out the conduit opening 24. Thereby powering a light assembly (not shown) in the cover portion 14 (FIGS. 1, 2, and 3) and illuminating the light compartment 18 (FIG. 2), without any of the wires 64 being visible to a viewer. Additionally, the light assembly may be easily removed from the removable cover portion 14 and replaced with another light assembly with a minimum of effort.

What is claimed is:

1. A modular light housing apparatus for removably holding a light source powered by wires, the apparatus comprising:

a light transmissible portion and a cover portion, the cover portion releasably coupled to the light transmissible portion;

the light transmissible portion having a mounting region located opposite the cover portion, and a light compartment configured for transmitting light from the apparatus;

a wire passage between the mounting region and the light compartment;

the light compartment comprising a wire conduit proximate to the wire passage, the wire conduit having a conduit opening opposite the wire passage;

the cover portion having a light mount for holding the light source;

wherein the wires travel through the wire passage, wire conduit, and out the conduit opening to engage the light source in the light mount; and wherein the cover portion further comprises a wire channel extending from the conduit opening to the light mount and a reflector panel, the reflector panel having a tab configured to cover the wire channel.

2. The apparatus of claim 1 further comprising a translucent light mount cover for covering the light source in the light mount.

3. The apparatus of claim 1 further comprising a bottom reflector opposite the light mount.

4. The apparatus of claim 1 wherein the mounting region comprises a mounting flange whereby the light fixture is configured for seating on a fence post.

5. The apparatus of claim 1 wherein the light transmissible portion further comprises a frame defining the light compartment.

6. The apparatus of claim 5 wherein the frame comprises the wire conduit.

7. The apparatus of claim 5 wherein the frame defines a light transmission window.

8. The apparatus of claim wherein 1 wherein the light transmissible portion comprises a support flange and a bottom reflector, together defining the wire passage.

9. The apparatus of claim 8 wherein the support flange comprises a pane clip.

10. A modular light housing apparatus for removably holding a light source powered by wires, the apparatus comprising:

a light transmissible portion and a cover portion, the cover portion releasably coupled to the light transmissible portion;

the light transmissible portion having a mounting region opposite the cover portion, and a light compartment configured for transmitting light from the apparatus;

a plurality of wire passages between the mounting region and the light compartment; a frame defining the light compartment;

the frame comprising a plurality of wire conduits, each proximate to one of the plurality of wire passages, the plurality of wire conduits each having a conduit opening opposite one of the plurality of wire passages;

the cover portion having a light mount for holding the light source;

wherein the wires travel through at least one of the plurality of wire passages, at least one of the wire conduits, and out at least one of the conduit openings to engage the light source in the light mount; and wherein the cover portion further comprises a wire channel extending from the conduit opening to the light mount and a reflector panel, the reflector panel having a tab configured to cover the wire channel.

11. The apparatus of claim 9 wherein the cover portion further comprises a plurality of wire channels, each wire channel extending from one of the plurality of conduit openings to the light mount.

* * * * *